United States Patent [19]

Davis et al.

[11] 3,789,803

[45] Feb. 5, 1974

[54] INDUCTOR-LESS TELEPHONE LINE HOLDING CIRCUIT GIVING HIGH A.C. SHUNT IMPEDANCES

[75] Inventors: Steven J. Davis, Ridgefield; Stephen L. Domyan, Bridgeport, both of Conn.

[73] Assignee: General Datacomm Industries, Norwalk, Conn.

[22] Filed: Nov. 15, 1971

[21] Appl. No.: 198,789

[52] U.S. Cl. .................................. 179/81 R, 179/99

[51] Int. Cl. .............................................. H04m 1/00

[58] Field of Search.. 179/16 A, 16 AA, 16 F, 18 F, 179/18 FA, 170 D, 170.2, 99, 81 R; 330/9

[56] References Cited

UNITED STATES PATENTS

| | | | |
|---|---|---|---|
| 3,448,393 | 6/1969 | Rice, Jr. | 330/9 |
| 3,629,514 | 12/1971 | Flamini, Jr. | 179/99 |
| 3,465,259 | 9/1969 | Peck | 330/9 |

OTHER PUBLICATIONS

Ralph Tenny, Popular Electronics, "The Operational Amplifier" August 1971, page 30.

Robert Klatt, EDN/EEE, "Narrow Peaks Caught by Better Detector" August 1971, page 43.

Gary Labelle, EDN/EEE, "Overcoming Stability Problems in Applying FET–Input OP Amps", Nov. 15, 1971, page 19.

Applications Manual for Operational Amplifiers, Teledyne Co., 1968.

*Primary Examiner*—Kathleen H. Claffy
*Assistant Examiner*—Randall P. Myers
*Attorney, Agent, or Firm*—Pennie & Edmonds

[57] ABSTRACT

A circuit is disclosed for eliminating the inductor ordinarily used to provide large A.C. shunt impedances in a telephone line holding circuit. A relatively low resistance path through the output of an amplifier and one of its voltage supply inputs shunts the input of the line holding circuit. The input is also shunted by a phase shifting and voltage dividing network that phase shifts the input A.C. signal to cause the current signal to lead the voltage signal. The phase shifted signal is applied to the input of the amplifier. The amplifier has a gain of one and the voltage of the signal applied to it approaches the voltage at the input to the circuit. As a result, the A.C. signal voltage at the output of the amplifier has a magnitude and phase relation with respect to that of the input signal that produces a high A.C. shunt impedance.

6 Claims, 3 Drawing Figures

INVENTOR

BY

ATTORNEY

INDUCTOR-LESS TELEPHONE LINE HOLDING CIRCUIT GIVING HIGH A.C. SHUNT IMPEDANCES

SUMMARY OF THE INVENTION

This concerns a novel telephone line holding circuit that achieves a large A.C. shunt impedance without an inductor.

In the design and fabrication of modern electronic circuits, it is frequently desirable to avoid the use of inductors because such devices cannot readily be fabricated or assembled. In our invention we have devised a telephone line holding circuit that eliminates the inductor ordinarily used in line holding circuits to provide large A.C. shunt impedances. A relatively low resistance path through the output of an amplifier and one of its voltage supply inputs shunts the output of the line holding circuit. The output is also shunted by a phase shifting and voltage dividing network that phase shifts the input A.C. signal to cause the current signal to lead the voltage signal. The phase shifted signal is applied to the input of the amplifier. The amplifier has a gain of one and the voltage of the signal applied to it approaches the voltage at the input to the circuit. As a result, the A.C. signal voltage at the output of the amplifier has a magnitude and phase relation with respect to that of the input signal that produces a high A.C. shunt impedance.

These and other objects, features and elements of our invention will be more readily apparent from the following detailed description of the drawing in which.

DETAILED DESCRIPTION OF THE DRAWING

Figure 1:
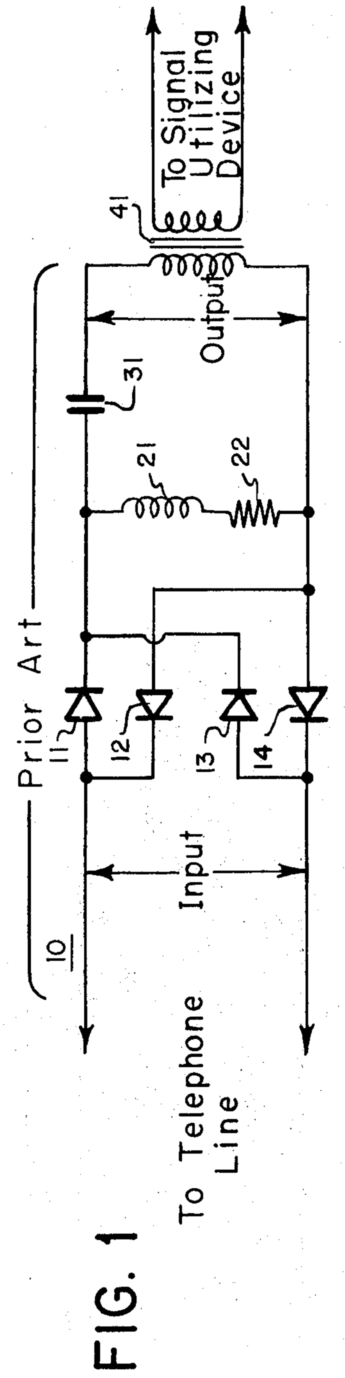
FIG. 1 is a schematic diagram illustrating a typical line holding circuit of the prior art.

As shown in FIG. 1, a typical line holding circuit 10 of the prior art comprises diodes 11, 12, 13, and 14 and an inductor 21 and a resistor 22 that shunt a D.C. blocking capacitor 31 and an output that is the primary winding of a transformer 41. Typically, inductor 21 has an inductance of 1 henry and a resistance of 200 ohms; resistor 22 has a resistance of 200 ohms; and capacitor 31 has a capacitance of 2 microfarads. Diodes 11, 12, 13, and 14 are used to provide an input signal to the line holding circuit that has a constant polarity regardless of the polarity of the signal on the telephone line. As will be evident to those skilled in the art, D.C. line holding current is blocked by capacitor 31 and passes through inductor 21 and resistor 22. A.C. signals, however, are directed through the primary winding of transformer 41; and therefore are coupled to the input of any signal utilization device.

As is well known, the A.C. shunt impedance of inductor 21 and resistor 22 is as high as possible in order to reduce A.C. signal flow through this shunt as much as possible. In the circuit of FIG. 1, such a high shunt impedance is provided by the relatively large inductance of inductor 21. In modern electronic technology, however, it is inconvenient to produce large impedances by means of inductors. Although large inductor coils will provide large inductances and therefore large impedances, it is expensive to connect such coils to the integrated circuits that preferably are used today; and the use of such coils thwarts attempts at miniaturization.

Figure 2:
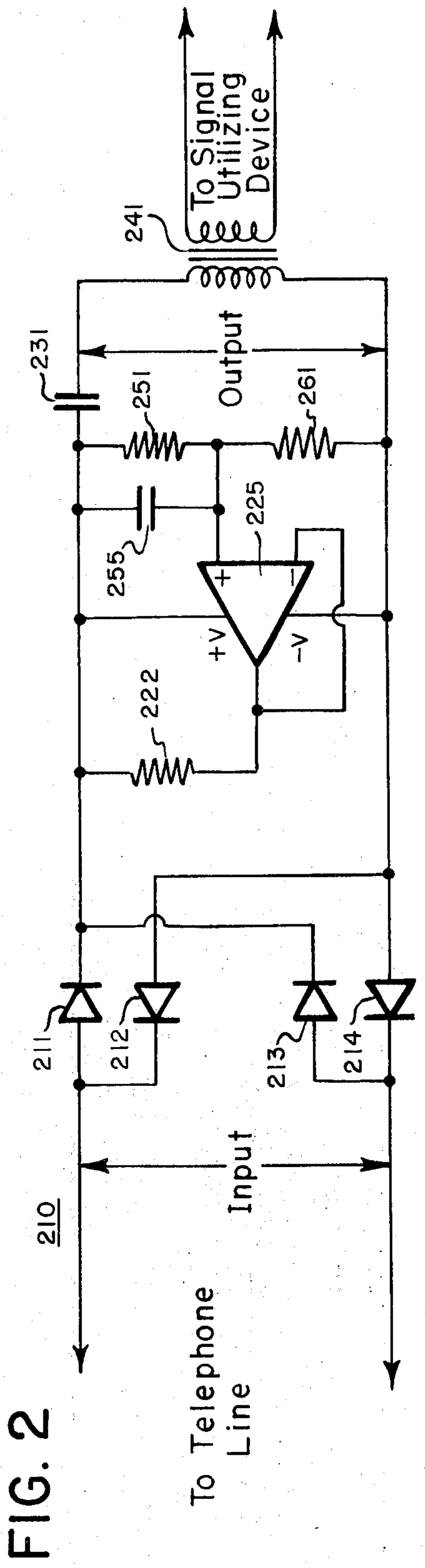
FIG. 2 is a schematic illustration of a line holding circuit modified according to an illustrative embodiment of our invention.

In order to avoid these problems, we have devised an inductor-less circuit having the same D.C. characteristics that are present in a conventional line holding circuit and a high A.C. shunt impedance. As illustrative embodiment of our invention is shown in FIG. 2. Circuit 210 comprises diodes 211, 212, 213, and 214, resistors 222, 251, and 261, capacitors 231 and 255, amplifier 225, and transformer 241. Diodes 311, 212, 213, and 214 operate in the same fashion as diodes 11, 12, 13, and 14 to cause the input signal to have a constant polarity. Thus, for the diode connections shown in FIG. 2, the upper input lead will always be more positive than the lower input lead. Capacitor 231 is a D.C. blocking capacitor connected between the input to circuit 210 and the output, which is shown as the primary winding of transformer 241. Capacitor 255 and resistors 251 and 261 provide a phase shifting and voltage dividing network. Illustratively, resistors 251 and 261 have equal resistance and the D.C. voltage at the node between these resistors is therefore one-half the input D.C. voltage. Capacitor 255 and resistor 261 phase shift the input signal and also divide its voltage. The values of capacitor 255 and resistor 261 are chosen so that the A.C. signal voltage at the node between them approaches the input voltage. As is well known, the phase shift introduced by capacitor 255 and resistor 261 is such that the current leads the voltage.

The signal from the phase shifting and voltage dividing network is applied to the positive input terminal of amplifier 225. As described above, the output of amplifier 225 is connected to resistor 222. The output of amplifier 225 is also connected to its negative input terminal to provide a feedback path. Those skilled in the art will recognize that amplifier 225 is an operational amplifier having a gain of plus one. Power for amplifier 225 is obtained by connecting the +V power supply terminal of amplifier 225 to the more positive of the two input leads and the −V power supply terminal to the less positive input lead. Numerous integrated circuit chips are available that can be used for amplifier 225. It is necessary, however, that the amplifier provide a low resistance D.C. path from the output to the −V power supply terminal. Appropriate amplifiers are the 709 and 741 types such as the LM-709 and the LM-741 available from National Semiconductor.

Any D.C. signal applied to the input of circuit 210 sees a relatively low resistance path through resistor 222 and the −V power supply terminal and a relatively high resistance path through resistors 251 and 261 in the voltage dividing network. The D.C. signal is blocked from the output of the circuit by blocking capacitor 231. Because the resistors in the voltage dividing network have approximately equal resistance, the voltage across resistor 261 is approximately half that across the input leads. Because amplifier 225 has a gain of one, the voltage across the output of the amplifier and the less positive input lead will also be one-half that across the input. As a result, the D.C. current flow through resistor 222 will be the equivalent of that through a resistor having twice the resistance of resistor 222.

In contrast, an A.C. signal is passed by blocking capacitor 231 to the output of circuit 210 and a portion of this A.C. signal is shunted by shunt paths through the phase shifting and voltage dividing network and through resistor 222. However, in circuit 210 a high shunt impedance is presented to the A.C. signal with the result that very little of the A.C. signal is shunted. Specifically, the input A.C. signal is phase shifted by capacitor 255 and resistor 261 so that its current leads its voltage. Simultaneously, the A.C. voltage is divided by capacitor 255 and resistor 261. Because the resistance of resistor 261 is chosen to be relatively high, the voltage drop across this resistor and therefore the voltage drop between the outuut of amplifier 225 and the less positive input lead approaches the voltage across the input. Consequently, there is very little A.C. voltage drop across resistor 222; and therefore very little of the A.C. signal is shunted through this resistor.

If the effect of resistor 251 is negligible, the A.C. voltage drop across resistor 261 can readily be shown to be equal to $Ke_{A.C.}$ where $e_{A.C.}$ is the voltage across the input and $K \approx j\omega CR/(1 + j\omega CR)$, where $\omega$ is the frequency of the A.C. signal, $C$ is the capacitance of capacitor 255, and R is the resistance of resistor 261. Because amplifier 225 has a gain of one, this is also the voltage drop between the output of amplifier 225 and the less positive of the input leads. Consequently, the voltage drop across resistor 222 is $$e_{A.C.} - 0\ Ke_{A.C.} = (1-K)e_{A.C.}.$$

The A.C. current through resistor 222 is therefore $$I_{A.C.} = (1-K)e_{A.C.}/R'$$

where $R'$ is the resistance of resistor 222. Consequently, resistor 222 provides a virtual A.C. impedance equal to $$Z_{A.C.\ virtual} = R'/(1-K) = R'\ (1+j\omega RC) = R'+j\omega R'RC.$$

Figure 3:
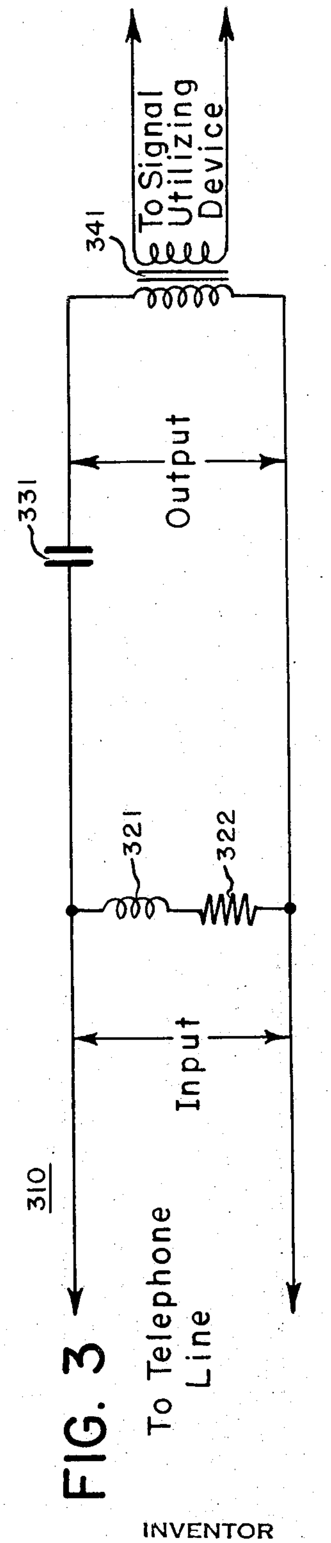
FIG. 3 is a schematic illustration of an equivalent circuit of the illustrative embodiment shown in FIG. 2.

An equivalent of the circuit 210 seen by the A.C. signal is shown in FIG. 3 as circuit 310. Circuit 310 comprises an inductor 321 and a resistor 322 that shunt a capacitor 331 and an output which is the primary winding of a transformer 341. The similarity to the prior art circuit of FIG. 1 is evident. The values of the inductance, resistance, and capacitance of the elements of FIG. 3 may readily be determined from the corresponding values of the elements of FIG. 2. Illustratively, resistors 222 and 261 have resistances of 200 ohms and 100 kilohms, respectively; and capacitors 231 and 255 have capacitances of 10 microfarads each. For these values, $Z_{A.C.\ virtual}$ is 200 ohms + 200 henry; and the inductance of inductor 321 is therefore 200 henry while the resistance of resistor 322 is 200 ohms. The capacitance of capacitor 331 is, of course, 10 microfarads, the same as that of capacitor 231.

As indicated above, when resistor 251 has the same resistance as resistor 261, the virtual D.C. resistance of resistor 222 is doubled. Consequently, when resistor 222 is a 200 ohm resistor, the effective D.C. shunt resistance is 400 ohms which is the same as that in conventional line holding circuits. Thus, our invention provides the same D.C. shunt impedance as the prior art circuit 10 of FIG. 1 and a much greater A.C. shunt impedance. In passing, it should also be noted that resistor 251 will indeed have negligible effect on the A.C. signal performance of the circuit when its resistance and that of resistor 261 are 100 kilohms and capacitor 255 has a capacitance of 10 microfarads.

As will be obvious to those skilled in the art, numerous modifications may be made in our invention. For example, more complicated networks can be used in place of our relatively simple phase shifting and voltage dividing network. More complicated amplifier stages may also be used. As will be evident, resistors 251 and 261 may be a single resistor with a tap or they may be separate devices.

The values given above in the discussion of FIG. 3 for the resistances of resistors 222, 251, and 261 and the capacitance of capacitors 231 and 255 are illustrative values for the use of our invention in an inductor-less telephone line holding circuit. Other resistance values may be used to provide the effective D.C. shunt resistance through resistor 222 for which the telephone line is designed. The values of the capacitance of capacitor 255 and the resistance of resistor 261 may also be varied to alter the effective A.C. shunt impedance.

Numerous other modifications may be made in the illustrative embodiment we have shown without departing from the spirit and scope of our invention.

What is claimed is:

1. A telephone line holding circuit providing large A.C. shunt impedances comprising:

an input having first and second leads;

an output connected between said first and second input leads;

an amplifier having a gain of one;

a relatively low resistance D.C. path shunting said two leads, said path passing from said first input lead, through a resistor, the output of the amplifier and a voltage supply input to the amplifier, to said second input lead; and means connected between at least one input lead and an input to said amplifier for introducing a phase shift in an input A.C. signal such that the current leads the voltage at the input to the amplifier while also providing that the A.C. signal voltage at said amplifier input approaches the voltage across the first and second input leads.

2. The line holding circuit of claim 1 wherein:

said means connected between at least one input lead and an input to said amplifier comprises a first resistor and a first capacitor connected in parallel and a second resistor connected in series to the parallel combination of the first resistor and the first capacitor, thereby defining a node between one end of the second resistor and one end of both the first resistor and first capacitor;

the other end of both the first resistor and first capacitor is connected to the first lead and the other end of the second resistor is connected to the second lead; and the input to the amplifier is connected to said node.

3. The line holding circuit of claim 2 wherein the first and second resistors have approximately equal resistance.

4. The line holding circuit of claim 1 further comprising a blocking capacitor that blocks a D.C. signal from the output.

5. The line holding circuit of claim 1 wherein:

the input comprises two leads, one of which is more positive than the other; and the amplifier has a positive voltage supply terminal that is connected to the more positive input lead and a negative supply terminal that is connected to the less positive input lead.

6. A method of eliminating the use of an inductor in a telephone line holding circuit to provide high A.C. shunt impedances comprising the steps of:

establishing across first and second input leads to the circuit a low resistance D.C. shunt path passing from the first input lead, through a resistor, the output of an amplifier having a gain of one and a voltage supply input to the amplifier, to the second input lead;

phase shifting an A.C. input signal to cause the A.C. current to lead the A.C. voltage; and applying to an input to the amplifier the phase shifted A.C. signal at a voltage approaching that across the first and second input leads.

* * * * *